(12) United States Patent
Uda et al.

(10) Patent No.: US 7,867,394 B2
(45) Date of Patent: Jan. 11, 2011

(54) MEMBRANE ELEMENT SEALING MATERIAL HOLDING MEMBER AND MEMBRANE ELEMENT

(75) Inventors: Yasuhiro Uda, Ibaraki (JP); Masashi Beppu, Ibaraki (JP); Hiroki Fujioka, Ibaraki (JP); Yuuji Nishida, Ibaraki (JP); Shinichi Chikura, Ibaraki (JP); Hideki Matsuda, Ibaraki (JP); Katsumi Ishii, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 260 days.

(21) Appl. No.: 12/298,299

(22) PCT Filed: Apr. 20, 2007

(86) PCT No.: PCT/JP2007/058639
§ 371 (c)(1),
(2), (4) Date: Oct. 23, 2008

(87) PCT Pub. No.: WO2007/123206
PCT Pub. Date: Nov. 1, 2007

(65) Prior Publication Data
US 2009/0095670 A1 Apr. 16, 2009

(30) Foreign Application Priority Data
Apr. 24, 2006 (JP) ............................. 2006-119106

(51) Int. Cl.
*B01D 63/10* (2006.01)
*B01D 63/12* (2006.01)
*B01D 61/00* (2006.01)
(52) U.S. Cl. ............................. 210/321.85; 210/321.76

(58) Field of Classification Search ....................... None
See application file for complete search history.

(56) References Cited

U.S. PATENT DOCUMENTS 4,296,951 A * 10/1981 Zimmerly ..................... 285/95

(Continued)

FOREIGN PATENT DOCUMENTS

EP 0 943 367 9/2005

(Continued)

OTHER PUBLICATIONS

International Search Report issued on the corresponding PCT Application No. PCT/JP2007/058639, dated May 22, 2007.

(Continued)

*Primary Examiner*—Krishnan S Menon
(74) *Attorney, Agent, or Firm*—Knobbe Martens Olson & Bear LLP (57) ABSTRACT

A membrane element sealing material holding member comprising a central opening for insertion of a center tube of spiral membrane element, peripheral orifice for flowing of a raw liquid into a membrane end portion of membrane element and outer circumferential part for holding of circular sealing material, wherein the central opening has inner circumferential surface of cylindrical form with a diameter larger than the outer diameter of the inserted center tube, and wherein at three or more positions on the inner circumferential surface, there is provided projection that has sloping face on its side of center tube insertion and is deformable at the time of insertion of center tube with an outer diameter larger than that of incircle.

15 Claims, 6 Drawing Sheets

U.S. PATENT DOCUMENTS

| | | | |
|---|---|---|---|
| 4,517,085 A * | 5/1985 | Driscoll et al. | 210/232 |
| 5,651,888 A | 7/1997 | Shimizu et al. | |
| 5,817,235 A * | 10/1998 | Tortosa | 210/232 |
| 6,224,767 B1 | 5/2001 | Fujiwara et al. | |
| 6,632,356 B2 * | 10/2003 | Hallan et al. | 210/321.6 |
| 6,942,797 B1 * | 9/2005 | Chancellor et al. | 210/321.64 |
| 7,063,789 B2 * | 6/2006 | Colby et al. | 210/321.85 |
| 2005/0035047 A1 | 2/2005 | Colby et al. | |
| 2006/0070940 A1 | 4/2006 | Colby et al. | |
| 2006/0180540 A1 | 8/2006 | Colby et al. | |
| 2007/0017860 A1 * | 1/2007 | Chikura et al. | 210/321.83 |
| 2009/0277825 A1 * | 11/2009 | Beppu et al. | 210/321.74 |

FOREIGN PATENT DOCUMENTS

| | | |
|---|---|---|
| JP | 56-062105 | 5/1981 |
| JP | 57-058401 | 4/1982 |
| JP | 6-210142 | 8/1994 |
| JP | 11-207156 | 8/1999 |
| JP | 11-267468 | 10/1999 |
| JP | 11-267469 | 10/1999 |
| JP | 11-267470 | 10/1999 |
| JP | 2000-093761 | 4/2000 |
| JP | 2004-536703 | 12/2004 |
| JP | 2006-175412 | 7/2006 |
| JP | 2007-517661 | 7/2007 |
| JP | 2007-190547 | 8/2007 |
| WO | WO 03/011441 A1 | 2/2003 |

OTHER PUBLICATIONS

File History of the related U.S. Appl. No. 12/158,654, as of Dec. 2, 2010.

File History of the related U.S. Appl. No. 12/918,163, as of Dec. 2, 2010.

* cited by examiner

MEMBRANE ELEMENT SEALING MATERIAL HOLDING MEMBER AND MEMBRANE ELEMENT

This application is the U.S. National Phase under 35 U.S.C. §371 of International Application No. PCT/JP2007/058639, filed Apr. 20, 2007, which claims priority the Japanese Patent Application No. 2006-119106, filed Apr. 24, 2006. The International Application was not published in English under PCT Article 21(2).

TECHNICAL FIELD

The present invention relates to a sealing material holding member that is attached to an end part of a spiral membrane element for holding a sealing material that shuts off the gap between a pressure vessel and the membrane element, as well as to a membrane element using the same.

BACKGROUND ART

Figure 7:
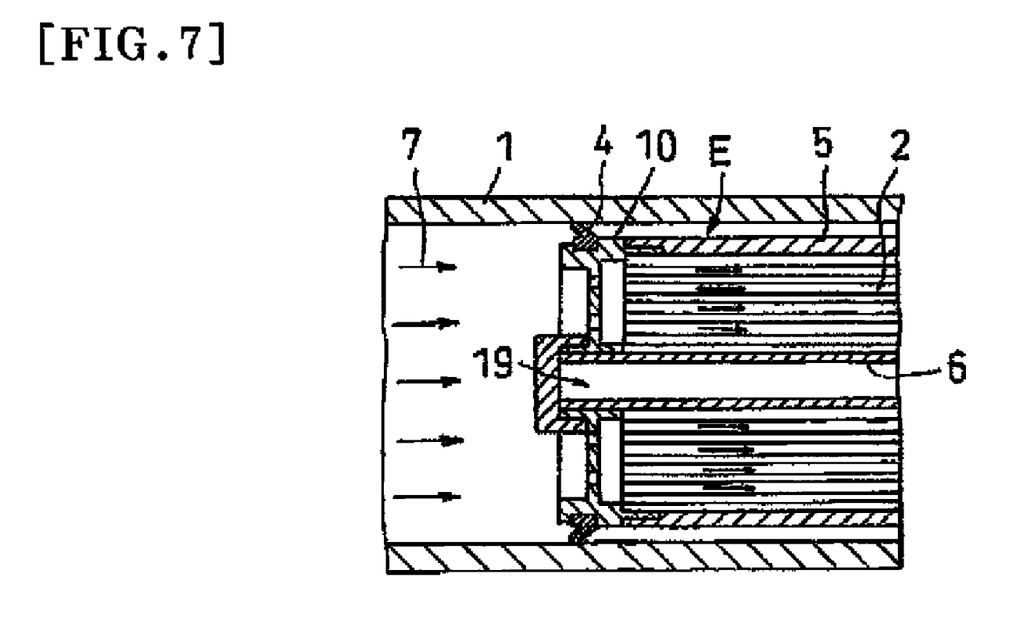
FIG. 7 is a partial cross-sectional view showing an example of an attachment state of a conventional membrane element sealing material holding member.

Conventionally, a spiral separation membrane module is used for a variety of uses such as desalination of brine or sea water, production of ultrapure water, and processing of waste water. As shown in FIG. 7, a spiral separation membrane module has a structure such that a spiral separation membrane element E is housed in a pressure vessel 1, where the gap between the pressure vessel 1 and the element E is shut off with an annular sealing material 4 so as to let the supplied raw liquid 7 flow efficiently into the element E.

The raw liquid that has flown into the element E is subjected to separation with a separation membrane while flowing to the downstream side along a supply-side flow channel material of the element E. The transmitted liquid that has been transmitted through the separation membrane flows along a transmittance-side flow channel material to be collected into a center tube 6. Then, the membrane part of the element E has a structure such that a membrane laminate 2 in which the supply-side flow channel material, the separation membrane, and the transmittance-side flow channel material are laminated is wound in a spiral form around the center tube 6.

Also, at the end part of the element E, there is provided a sealing material holding member 10 that holds the annular sealing material 4 on the outer circumferential part thereof. The sealing material 4 is made of rubber or the like having a cross-section with a U-letter or V-letter shape, and widens to the outside by the pressure at the time of receiving a water flow, so as to seal the gap between the membrane element E and the pressure vessel 1 in that state (see, for example, Patent Document 1)

At the center of the sealing material holding member 10, there is provided a central opening part 19 into which the center tube 6 is inserted. The inner circumferential surface thereof has a cylindrical form having a flat surface or a cylindrical form having a plurality of convex streaks (ribs) in the axial direction. Then, the height of the convex streaks and the like are designed so as to have a dimension such that the outer circumferential surface of the center tube 6 inscribes the inner circumferential surface or the convex streaks of the central opening part 19.

However, there are cases in which the outer diameter dimension of the center tube 6 varies during the production steps. In particular, it has been made clear that, between Japan and the United States, even if the outer diameter has an identical designed dimension, there may occur a difference of as large as about 0.8 mm in terms of an average value of the outer diameter. When clearance is increased in consideration of such a variation, the center tube 6 is liable to become eccentric relative to the sealing material holding member 10, thereby aggravating the outer appearance and degrading the commercial quality of the product in some cases. Also, when the center tube 6 is made eccentric, the operation of attaching the membrane element may become cumbersome depending on the structure of the pressure vessel 1, thereby raising a problem in that the connection operation may become cumbersome in connecting a plurality of membrane elements for use, or the like problem.

Patent Document 1: Japanese Patent Application Laid-Open (JP-A) No. 11-267470.

DISCLOSURE OF THE INVENTION

Problems to be Solved by the Invention

Therefore, an object of the present invention is to provide a membrane element sealing material holding member that can hold a center tube at the center and facilitate the insertion of the center tube even if the outer diameter dimension of the center tube varies, as well as a membrane element using the same.

Means for Solving the Problems

The aforementioned object can be achieved by the present invention as described below.

That is, the membrane element sealing material holding member of the present invention is a membrane element sealing material holding member including a central opening part for insertion of a center tube of a spiral membrane element, a peripheral opening part for flowing of a raw liquid into a membrane end part of the membrane element, and an outer circumferential part for holding of an annular sealing material, characterized in that the central opening part has an inner circumferential surface of a cylindrical form with a diameter larger than the outer diameter of the center tube to be inserted, and that, at three or more positions on the inner circumferential surface, there is provided a protrusion that has a tilted surface on its center tube insertion side and is deformable at the time of insertion of the center tube with an outer diameter larger than that of an inscribing circle.

According to the sealing material holding member of the present invention, a protrusion capable of being deformed at the time of insertion of the center tube having an outer diameter larger than that of the inscribing circle is formed on the inner circumferential surface of the central opening part into which the center tube is inserted. Therefore, even if the outer diameter dimension of the center tube varies, the variation can be coped with by the deformation of the protrusion. At that time, since protrusions are provided at three or more positions on the inner circumferential surface, the center tube can be held at the center of the central opening part. Also, since the protrusion has a tilted surface on the center tube insertion side thereof, the center tube is guided to be inserted by the tilted surface at the time of the insertion, and the protrusion can be smoothly deformed. Also, since the contact area thereof is smaller as compared with the inner circumferential surface even after the deformation of the protrusion, the insertion of the center tube can be carried out easily.

In the above, a length of the protrusion in an axial direction is preferably below or equal to half the length of the inner circumferential surface in the axial direction. By reducing the length of the protrusion in the axial direction in this manner, the protrusion will be more easily deformed, and also the contact area with the center tube can be reduced, whereby the insertion of the center tube can be carried out more easily. Also, since the length of the protrusion is reduced, the protrusion will be less likely to be observable from the outside after the assemblage, so that the outer appearance is not deteriorated.

Also, it is preferable that an auxiliary protrusion having a height lower than a height of the protrusion is formed on the inner circumferential surface. By this auxiliary protrusion, even if the amount of deformation of the plurality of protrusions becomes large, the variation of the amount of deformation of individual protrusions can be reduced, whereby the center tube can be held at the center with more certainty.

Also, it is preferable that the auxiliary protrusion has a tilted surface on its center tube insertion side, and has a bottom surface having a width larger than a width of the protrusion. With this structure, the width of the bottom surface of the auxiliary protrusion is large, thereby providing a structure that is less liable to be deformed. Therefore, even if the amount of deformation of the plurality of protrusions becomes large (even when the outer diameter of the center tube is large), the center tube can be held at the center with more certainty. Nevertheless, the center tube is guided by the tilted surface at the time of insertion, whereby the insertion of the center tube can be carried out easily.

Meanwhile, the membrane element of the present invention is characterized by including a membrane element sealing material holding member according to any one of the above, a center tube that is inserted in a state in which the protrusion is deformed, and a membrane laminate that is wound in a spiral form around the center tube. According to the membrane element of the present invention, since the sealing material holding member of the present invention is used, the center tube can be held at the center of the sealing material holding member, and moreover the insertion of the center tube can be carried out easily even if there is a variation in the outer diameter dimension of the center tube, as shown by the functions and effects described above. For this reason, the center tube will not be eccentric, and will be a commercial product having a good outer appearance, and a membrane element can be provided by which the operation of attachment to the pressure vessel and the operation of connection of a plurality of membrane elements can be carried out smoothly.

BRIEF DESCRIPTION OF THE DRAWINGS

FIG. 2(a) is a left side view; FIG. 2(b) is a cross-sectional A-A arrow view; and FIG. 2(c) is a right side view.

FIG. 4(a) is a left side view; FIG. 4(b) is a cross-sectional I-I arrow view; and FIG. 4(c) is a right side view.

DESCRIPTION OF SYMBOLS

2 Membrane part (membrane laminate) of membrane element
4 Sealing material
5 Outer cladding member
6 Center tube
10 Sealing material holding member
15a Peripheral opening part
16a Inner circumferential surface
18 Outer circumferential part
19 Central opening part
21 Protrusion
21a Tilted surface
22 Auxiliary protrusion
22a Tilted surface
E Membrane element

BEST MODES FOR CARRYING OUT THE INVENTION

Figure 1:
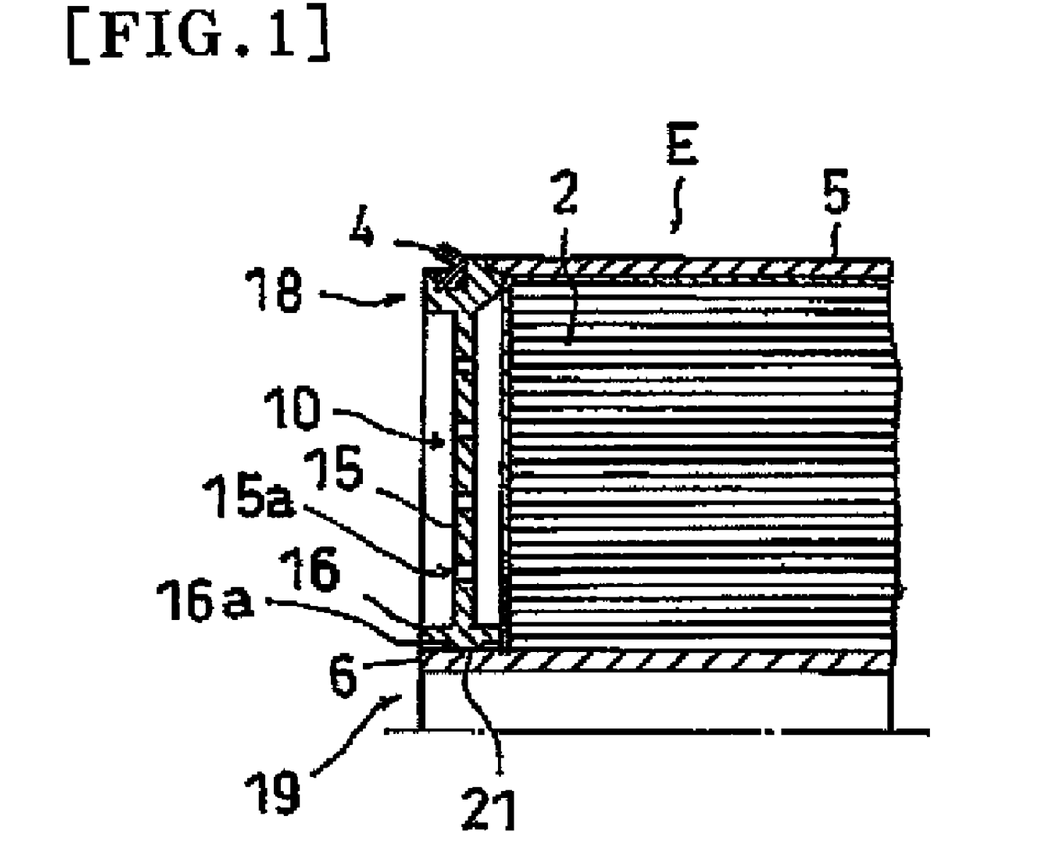
FIG. 1 is a half cross-sectional view showing an attachment state of one example of a membrane element sealing material holding member of the present invention.
Figure 2:
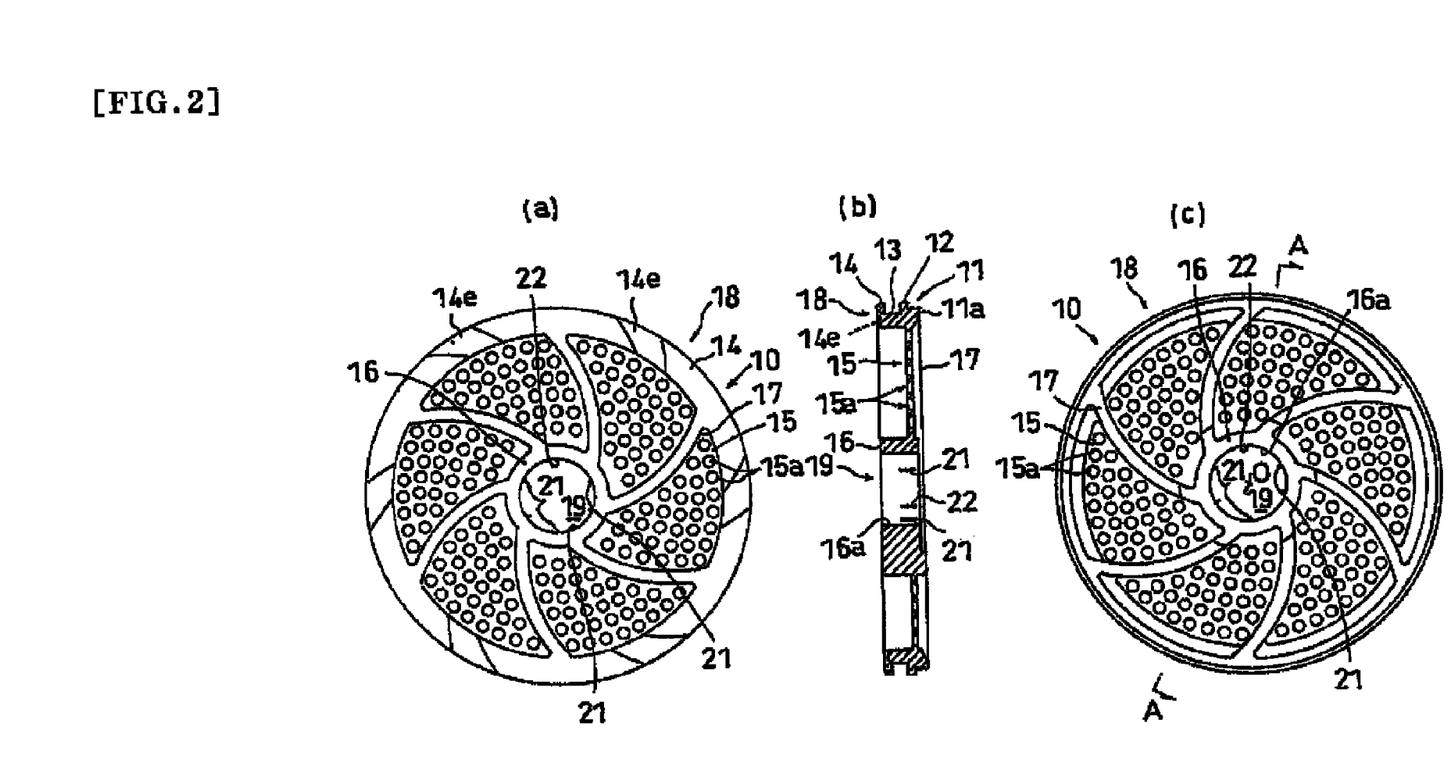
FIG. 2 is a view showing one example of a membrane element sealing material holding member of the present invention, where

Hereinafter, embodiments of the present invention will be described with reference to the drawings. FIG. 1 is a half cross-sectional view showing an attachment state of one example of a membrane element sealing material holding member of the present invention. FIG. 2 is a view showing one example of a membrane element sealing material holding member of the present invention, where FIG. 2(a) is a left side view; FIG. 2(b) is a cross-sectional A-A arrow view; and FIG. 2(c) is a right side view. FIGS. 3(a) to 3(d) are enlarged views of an essential part showing a protrusion and an auxiliary protrusion in the membrane element sealing material holding member of the present invention.

As shown in FIG. 1, the sealing material holding member of the present invention includes a central opening part 19 for insertion of a center tube 6 of a spiral membrane element E, a peripheral opening part 15a for flowing of a raw liquid into a membrane end part of the membrane element E, and an outer circumferential part 18 for holding of an annular sealing material 4. Meanwhile, the membrane element of the present invention includes a sealing material holding member 10 of the present invention, a center tube 6 that is inserted in a state in which a protrusion 21 is deformed, and a membrane laminate 2 that is wound in a spiral form around the center tube 6.

The membrane element E may be any one as long as it is one called what is known as a spiral membrane element. For example, the membrane laminate 2 thereof is such that a membrane laminate (a single or a plurality of membrane leaves) in which a supply-side flow channel material, a separation membrane, and a transmittance-side flow channel material are laminated is wound in a spiral form around the center tube 6. Also, it has a sealing structure such that the raw liquid may not flow directly from the supply-side flow channel to the transmittance-side flow channel. By this, the raw liquid that has flown into the membrane element E is subjected to separation with the separation membrane while flowing to the downstream side along the supply-side flow channel material of the element E. The transmitted liquid that has been transmitted through the separation membrane flows along the transmittance-side flow channel material to be collected into the center tube 6.

The sealing material 4 is held by the sealing material holding member 10 attached to an end part of the membrane element E. Also, the sealing material 4 may have a circular, elliptical, quadrangular, or other cross-sectional shape; however, in the present invention, a sealing material 4 having a shape with a released part having a U-shaped, V-shaped, U-shape turned sideways, or C-shaped cross-section is preferably used. The material of the sealing material 4 is preferably fabricated with an elastic substance such as rubber, elastomer, or resin, and the sealing material 4 having a U-shaped, V-shaped, or other cross-section widens to the outside by the pressure at the time of receiving the water flow, and can seal the gap between the element and the pressure vessel in that state.

As the outer cladding material 5, one can use, for example, a structure such that a roving, a tape, a sheet, or the like of fiber-reinforced resin is directly wound around the membrane element E. The end part of the outer cladding material 5 is preferably subjected to bonding or the like to the first annular part 11 of the sealing material holding member 10.

The center tube 6 has a plurality of holes at a suitable interval, and is made of resin or the like. The upstream-side end of the center tube 6 is used by being closed with a plug or the like in order to prevent the raw liquid from flowing thereinto, or is connected to other membrane elements E with a suitable connection member.

The outer circumferential part 18 of the sealing material holding member 10 has a side wall 11a that opposes the upstream-side end part of the membrane element E, as shown, for example, in FIG. 2, and includes a first annular part 11 onto which the end part of the outer cladding member 5 of the membrane element E is fitted, an annular convex part 12 formed on the upstream side of the first annular part 11 and capable of stopping the end surface of the outer cladding material 5 and the downstream-side end surface of the sealing material 4 by engagement on the two side walls thereof, a second annular part 13 which is formed on the upstream side of the annular convex part 12 and onto which the sealing material 4 is fitted, and a third annular part 14 formed on the upstream side of the second annular part 13 and capable of stopping the upstream side end surface of the sealing material by engagement.

Regarding the dimension of each part of the above (the width in the direction parallel to the axial direction of the membrane element E), it is preferable that the width of the annular convex part 12 is smaller than the width of the second annular part 13. Also, it is preferable that the width of the third annular part 14 is smaller than the width of the second annular part 13.

Specifically, it is preferable that the width of the first annular part 11 is from 5 to 8 mm; the width of the annular convex part 12 is from 3 to 5 mm; the width of the second annular part 13 is from 7 to 9 mm; and the width of the third annular part 14 is from 3 to 5 mm. By such a dimension of each part, the total width (thickness) of the sealing material holding member can be made to be from 15 to 30 mm while ensuring the groove for mounting the sealing material 4 and the adhesion margin for the outer cladding member 5.

In the present invention, it is preferable that the outer diameter of the third annular part 14 is smaller than the outer diameter of the annular convex part 12. By this, the upstream side of the groove for holding of the sealing material 4 will be low, thereby providing a structure in which the sealing material 4 can easily receive the water flow.

In the present embodiment, an example is shown in which an opening plate 15 having a plurality of peripheral opening parts 15a is provided as a structure for letting the raw liquid flow into the membrane end part of the membrane element E. In the case of adopting the opening plate 15, it will be easier to control the flow rate distribution of the raw liquid that flows into the membrane part of the membrane element E by the size, the arrangement, the density, and the like of the peripheral opening part 15a. However, the present invention is not limited thereto, so that one may adopt any structure such as being provided with radial spokes instead of the opening plate 15.

At the center of the above-described opening plate 15, a cylindrical part 16 is preferably provided, and the sealing material holding member 10 is disposed in a state in which the center tube 6 is inserted into the central opening part 19 of this cylindrical part 16. In the illustrated example, the position of forming the protrusion 21 in the axial direction and the position of forming the opening plate 15 in the axial direction constitute overlapping positions. By this, when the cylindrical part 16 has the center tube 6, the opening plate 15 reinforces the center tube 6, whereby the protrusion 21 can be deformed smoothly without deforming the center tube 6. Also, since the opening plate 15 is disposed more to the membrane side (the downstream side) than the central position of the sealing material holding member 10 in the axial direction, the length of the upstream side inner circumferential surface of the outer circumferential part 18 in the axial direction will be large, thereby facilitating the transportation by hooking of a finger. From such a view point, it is preferable that the protrusion 21 is disposed more to the membrane side than the center position of the sealing material holding member 10 in the axial direction.

In the present invention, as shown in FIG. 1, the central opening part 19 has a cylindrical inner circumferential surface 16a larger than the outer diameter of the center tube 6 to be inserted. The clearance between the center tube 6 and the inner circumferential surface 16a can be set to be, for example, from 0.3 to 2 mm in consideration of the variation of the outer diameter of the center tube 6.

Figure 3:
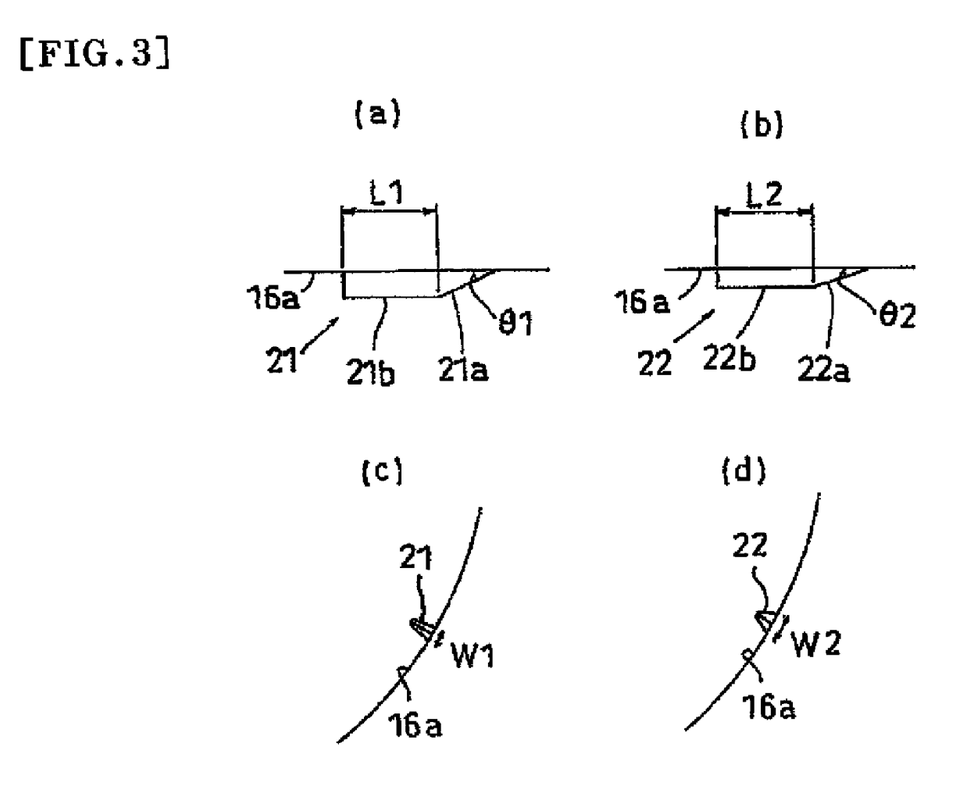
FIG. 3 is an enlarged view of an essential part showing a protrusion and an auxiliary protrusion in the membrane element sealing material holding member of the present invention.

In the present invention, as shown in FIGS. 2 and 3, at three or more positions on the inner circumferential surface 16a of the central opening part 19, there is provided a protrusion 21 having a tilted surface 21a on the center tube 6 insertion side and being deformable at the time of inserting the center tube 6 having an outer diameter larger than that of the inscribing circle. The protrusion 21 may be made of a material different from the material constituting the inner circumferential surface 16a; however, the protrusion 21 is preferably integrally molded with the same material as the inner circumferential surface 16a. Note that, the deformation of the protrusion 21 may be either plastic deformation or elastic deformation.

The positions at which the protrusion 21 is formed are preferably arranged with uniformity on the inner circumferential surface 16a, and are more preferably positions that almost equally divide the inner circumferential surface 16a, and are most preferably positions that equally divide the inner circumferential surface 16a. Also, the number of protrusions 21 to be formed is preferably from 3 to 10, more preferably from 3 to 6. In the present embodiment, an example is shown in which the protrusions 21 are formed at the positions that divide the inner circumferential surface 16a into three equal parts.

As shown in FIGS. 3(a) and 3(c), the protrusion 21 has a tilted surface 21a on the center tube 6 insertion side thereof. Here, the tilt angle $\theta1$ of the tilted surface 21a is preferably from 10 to 45°, more preferably from 15 to 35°, and still more preferably from 20 to 30° in view of performing the insertion of the center tube 6 and deformation of the protrusions 21 smoothly.

It is sufficient that the tilted surface 21a of the protrusion 21 has a shape such that the height thereof lowers as it goes to the center tube 6 insertion side. A tilted surface 21a being linear or approximately linear in the front view is preferable. The tilted surface 21a may be a plane; however, the shape thereof in a side view is preferably a circular arc shape.

In order to make the protrusion 21 be deformable, it is preferable to use a comparatively soft resin such as an ABS resin, a polyolefin resin such as PE or PP, a denatured PPE resin, a vinyl chloride resin, or a polysulfone resin as a material for molding the sealing material holding member 10. Also, as the shape of the protrusion 21, it is effective to make a shape that attains the maximum thickness at the bottom surface and has a small bottom surface width W1 in the side view. For example, the width W1 of the bottom surface of the protrusion 21 is preferably from 0.3 to 1 mm. Further, it is also effective to reduce the length L1 of the main body part 21b of the protrusion 21 in a front view. The length L1 is preferably from 1 to 10 mm, more preferably from 2 to 7 mm.

Also, the total length of the protrusion 21 in the axial direction is preferably smaller than the length of the inner circumferential surface 16a in the axial direction in view of facilitating the deformation of the protrusion and reducing the contact area with the center tube, and is more preferably equal to or smaller than half the length of the inner circumferential surface 16a in the axial direction.

The upper surface of the main body part 21b of the protrusion 21 is preferably a curved surface in view of reducing the contact area with the center tube, and is more preferably a curved surface having a circular arc shape (for example, having a radius of curvature of 0.2 mm).

In the present invention, as shown in FIG. 2, it is preferable that an auxiliary protrusion 22 having a height smaller than that of the protrusion 21 is formed on the inner circumferential surface 16a. The position at which the auxliary protrusion 22 is formed may be any position; however, in view of the design, it is preferably a position that equally divides the inner circumferential surface 16a together with the protrusion 21. In the illustrated example, a sum of three auxiliary protrusions 22 are formed at positions that equally bisect the middle of the positions for forming the protrusions 21.

The difference of height between the protrusion 21 and the auxiliary protrusion 22 is preferably from 0.2 to 0.8 mm, more preferably from 0.3 to 0.6 mm, in consideration of the variation of the outer diameter of the center tube 6. Here, the height of the auxiliary protrusion 22 is preferably from 0.2 to 1.2 mm.

As shown in FIGS. 3(b) and 3(d), the auxiliary protrusion 22 preferably has a tilted surface 22a on the center tube 6 insertion side. Also, the auxiliary protrusion 22 may have the same degree of deformability as the protrusion 21; however, in order to make the auxiliary protrusion 22 less deformable, the width W2 of the bottom surface of the auxiliary protrusion 22 is preferably larger than the width W1 of the bottom surface of the protrusion 21. The ratio of the width W2 of the bottom surface to the width W1 of the bottom surface (W2/W1) is preferably from 1.1 to 3.

The total length of the auxiliary protrusion 22 in the axial direction, the length L2 of the main body part 22b in the front view, the tilt angle θ2 of the tilted surface 22a, and others may be set respectively in the same manner as in the protrusion 21.

A plurality of ribs 17 obliquely extending from the radial direction are formed on both sides of the opening plate 15, and these ribs 17 reinforce the opening plate 15. The rib 17 on the upstream side has the same height as the upstream side end surface of the cylindrical part 16; however, the rib 17 on the downstream side is formed in such a manner that the end part on the inner circumference side is lower, and that part has the same height as the downstream side end surface of the cylindrical part 16.

At the end surface of the third annular part 14, there are provided a plurality of end surface groove parts 14e that extend from the inner circumference up to the outer circumference. The end surface groove parts 14e are preferably provided at four or more positions radially at an equal interval so as to let the raw liquid in and out of the membrane element come and go smoothly, and are more preferably provided at 6 to 16 positions.

The sealing material holding member 10 can be formed by a known method such as the injection molding with use of a thermoplastic resin, a thermosetting resin, a heat-resistant resin, or the like.

OTHER EMBODIMENTS

Hereinafter, other embodiments of the present invention will be described.

Figure 4:
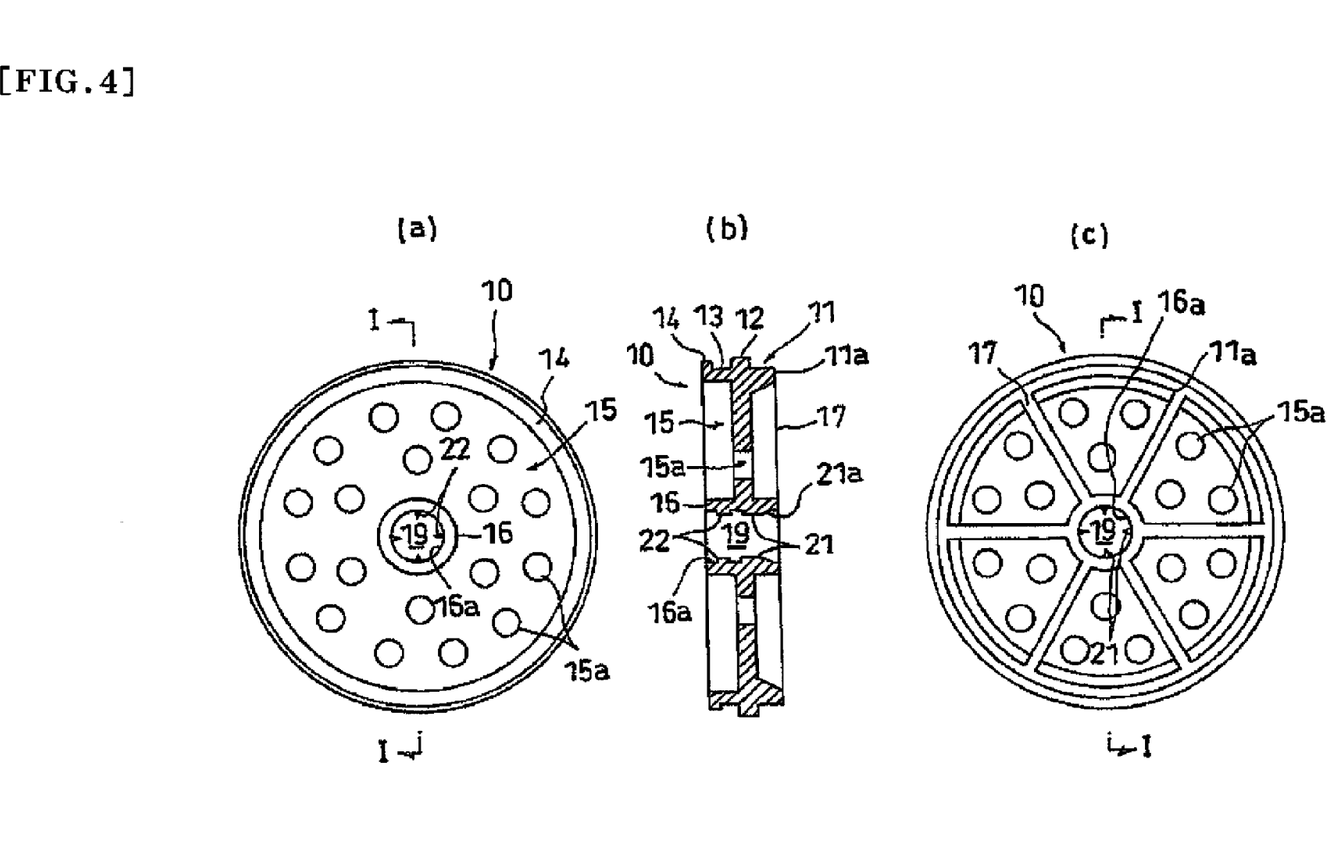
FIG. 4 is a view showing another example of a membrane element sealing material holding member of the present invention, where
Figure 5:
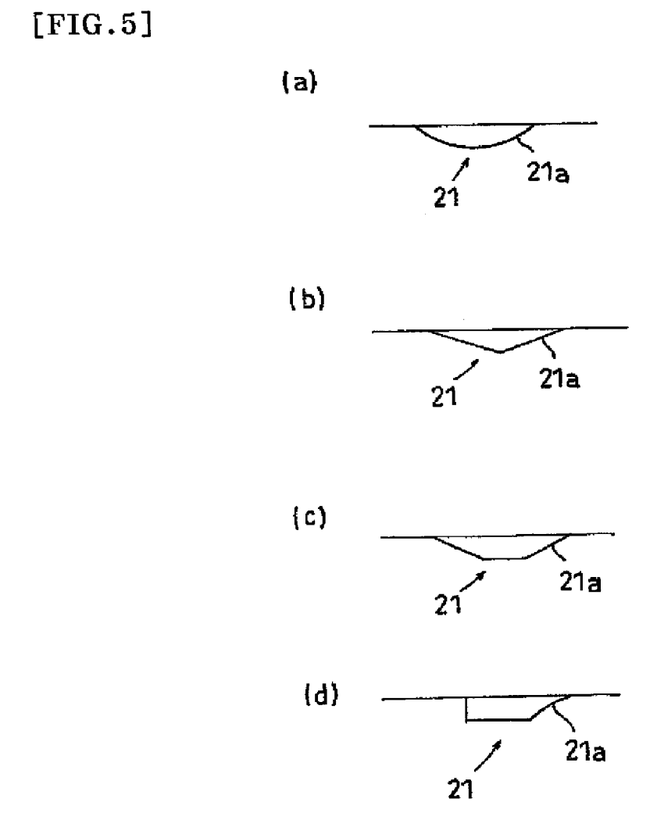
FIG. 5 is a view of an essential part showing still another example of a membrane element sealing material holding member of the present invention.

(1) In the above-described embodiment, an example has been shown in which the protrusions are formed at positions that equally divide the inner circumferential surface of the central opening part into three, and three auxiliary protrusions are formed at positions that equally bisect the middle of the positions for forming the protrusions. However, the protrusions and the auxiliary protrusions may be formed at front and rear positions in the axial direction, as shown in FIGS. 4(a) to 4(c). Also, one can omit forming the auxiliary protrusions, and further, more than three protrusions of different height may be formed respectively at three or more positions (for example, high protrusions at three positions, a little lower protrusions at three positions, and low protrusions at three positions).

In the illustrated example, four protrusions 21 and four auxiliary protrusions 22 are formed at the positions that divide the inner circumferential surface 16a of the central opening part 19 into four. Also, in this example, the shape of the ribs 17, the shape of the peripheral opening parts 15a, and the like are different from those of the above-described embodiment. In this way, for the constituent elements other than the protrusions 21 and the auxiliary protrusions 22, any of the conventionally known ones can be adopted.

(2) In the above-described embodiment, an example has been shown in which the protrusions and the like having a shape shown in FIG. 3 are provided. However, the protrusions in the present invention may be made of any material and may have any shape as long as they have a tilted surface on the center tube insertion side and are deformable at the time of inserting the center tube having an outer diameter larger than that of the inscribing circle.

Figure 6:
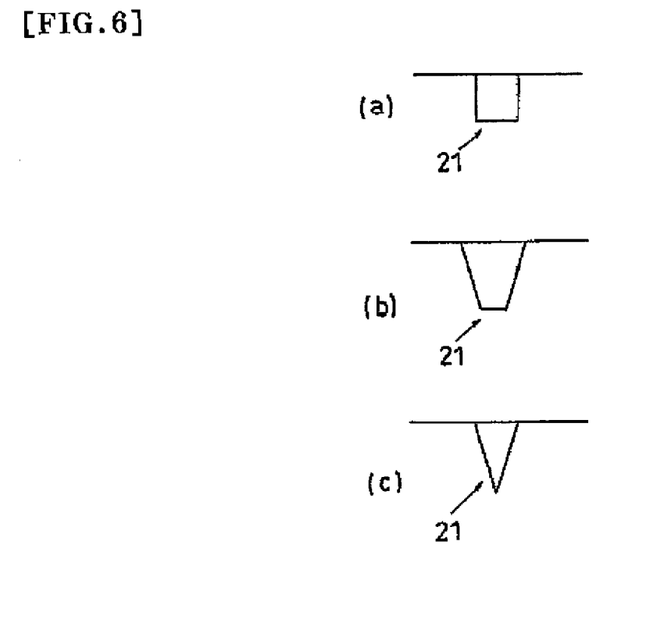
FIG. 6 is a view of an essential part showing yet another example of a membrane element sealing material holding member of the present invention.

For example, as shown in FIGS. 5(a) to 5(d), the shape of the protrusions 21 in the front view may be a circular arc shape, a triangular shape, a trapezoidal shape, a trapezoidal shape having a circular arc slant side, or the like shape. Also, as shown in FIGS. 6(a) to 6(c), the shape of the protrusions 21 in the side view may be a quadrangular shape, a trapezoidal shape, a triangular shape, or the like shape.

The invention claimed is:

1. A membrane element sealing material holding member comprising a central opening part for insertion of a center tube of a spiral membrane element, a peripheral opening part for flowing of a raw liquid into a membrane end part of the membrane element, and an outer circumferential part for holding of an annular sealing material, wherein the central opening part has an inner circumferential surface of a cylindrical form with a diameter larger than the outer diameter of the center tube to be inserted, and that, at three or more positions on the inner circumferential surface, there is provided a protrusion that has a tilted surface on its center tube insertion side and is deformable at the time of insertion of the center tube with an outer diameter larger than that of an inscribing circle.

2. The membrane element sealing material holding member according to claim 1, wherein a length of the protrusion in an axial direction is below or equal to half the length of the inner circumferential surface in the axial direction.

3. The membrane element sealing material holding member according to claim 1, wherein an auxiliary protrusion having a height lower than a height of the protrusion is formed on the inner circumferential surface.

4. The membrane element sealing material holding member according to claim 3, wherein the auxiliary protrusion has a tilted surface on its side of center tube insertion, and has a bottom surface having a width larger than a width of the protrusion.

5. A membrane element comprising a membrane element sealing material holding member according to claim 1, a center tube that is inserted in a state in which the protrusion is deformed, and a membrane laminate that is wound in a spiral form around the center tube.

6. The membrane element sealing material holding member according to claim 2, wherein an auxiliary protrusion having a height lower than a height of the protrusion is formed on the inner circumferential surface.

7. A membrane element comprising a membrane element sealing material holding member according to claim 2, a center tube that is inserted in a state in which the protrusion is deformed, and a membrane laminate that is wound in a spiral form around the center tube.

8. A membrane element comprising a membrane element sealing material holding member according to claim 3, a center tube that is inserted in a state in which the protrusion is deformed, and a membrane laminate that is wound in a spiral form around the center tube.

9. A membrane element comprising a membrane element sealing material holding member according to claim 4, a center tube that is inserted in a state in which the protrusion is deformed, and a membrane laminate that is wound in a spiral form around the center tube.

10. A membrane element comprising a membrane element sealing material holding member according to claim 6, a center tube that is inserted in a state in which the protrusion is deformed, and a membrane laminate that is wound in a spiral form around the center tube.

11. The membrane element sealing material holding member according to claim 1, wherein the protrusion is disposed more to the membrane side than the center position of the sealing material holding member in the axial direction.

12. The membrane element sealing material holding member according to claim 1, wherein the protrusion is integrally molded with the same material as the inner circumferential surface.

13. The membrane element sealing material holding member according to claim 1, wherein said membrane element sealing material holding member comprises 3 to 10 protrusions, and wherein the positions at which the protrusions are formed are arranged with uniformity on the inner circumferential surface.

14. The membrane element sealing material holding member according to claim 1, wherein the protrusions are formed from a deformable resin, and wherein the length of the protrusions is 1 to 10 mm.

15. The membrane element sealing material holding member according to claim 3, wherein the difference of height between the protrusion and the auxiliary protrusion is 0.2 to 0.8 mm.

* * * * *